United States Patent [19]

Baxter

[11] 4,064,560
[45] Dec. 20, 1977

[54] MASTER KEYBOARD TERMINAL WITH AUXILIARY KEYBOARD TERMINAL CAPABILITY

[75] Inventor: William D. Baxter, Seymour, Conn.

[73] Assignee: Bunker Ramo Corporation, Oak Brook, Ill.

[21] Appl. No.: 599,046

[22] Filed: July 25, 1975

[51] Int. Cl.² .................................................. G06F 3/04
[52] U.S. Cl. .............................. 364/900; 340/365 S; 340/365 R
[58] Field of Search .................... 340/172.5, 365 S; 179/2 DP

[56] References Cited

U.S. PATENT DOCUMENTS 3,699,525  10/1972  Klavins ............................. 340/172.5
3,833,888  9/1974  Stafford et al. .................... 340/172.5

Primary Examiner—Joseph M. Thesz
Assistant Examiner—C. T. Bartz
Attorney, Agent, or Firm—F. M. Arbuckle; M. Liss

[57] ABSTRACT

A master keyboard terminal is provided to communicate with a programmable control unit. Auxiliary keyboard terminals are connected to the master terminal, and utilize a substantial portion of the logic circuitry located in the master terminal. Auxiliary terminals may be scanned by the master terminal and data entered on the auxiliary terminals are communicated, through the master terminal, to the programmable control unit.

9 Claims, 2 Drawing Figures

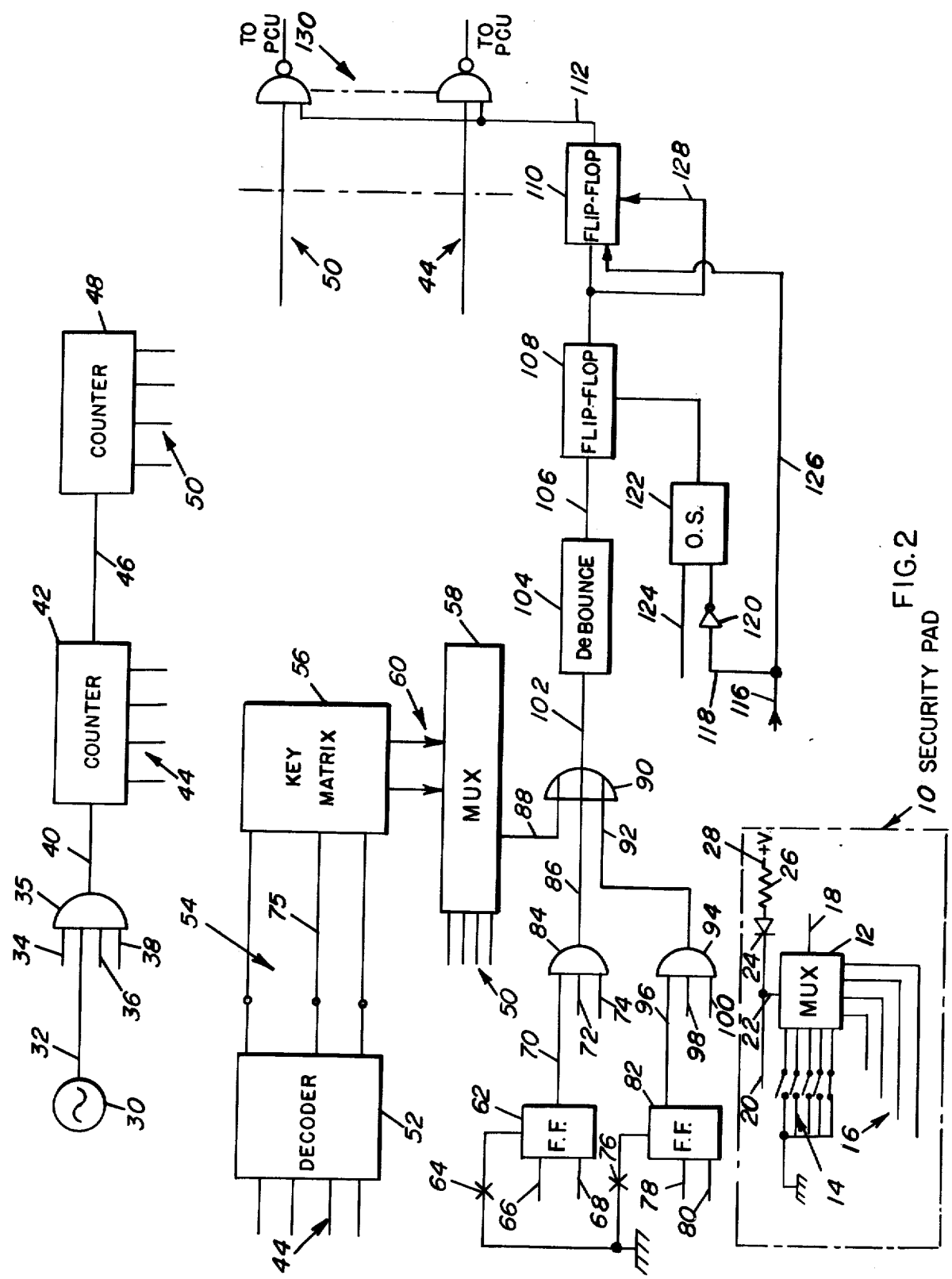

MASTER KEYBOARD TERMINAL WITH AUXILIARY KEYBOARD TERMINAL CAPABILITY

FIELD OF THE INVENTION

The following invention relates to computer terminals, and more particularly to a novel system utilizing auxiliary terminals that are scanned by a master terminal, logic in the master terminal being shared by the auxiliary terminal to communicate with a programmable control unit.

BRIEF DESCRIPTION OF THE PRIOR ART

In the past, keyboard terminal systems that communicate with a programmable control unit have been fabricated in the form of completely self-contained units. That is, each keyboard terminal includes a full complement of logic to permit the entered data to be communicated to the control unit. Although this concept operates satisfactorily, there is a definite disadvantage as to cost and reliability. A significant cost disadvantage occurs in prior art systems due to the redundant logic elements that must be associated with each keyboard terminal. Secondly, in view of the multiplicity of logic components, the system reliability is not optimized. Accordingly, a need has been detected for reducing the total number of logic components required in a typical system, resulting in a substantial savings as to cost as well as resulting in an increased system reliability.

BRIEF DESCRIPTION OF THE PRESENT INVENTION

The present invention utilizes the concept of time sharing logic components in a master keyboard terminal, by auxiliary keyboard terminals. A master keyboard terminal is constructed to have the capability of scanning a plurality of auxiliary keyboard terminals. Further, the data entered in an auxiliary terminal is communicated, through the logic of a master terminal, to a programmable control unit. The master terminal has full capability of communicating with the control unit and by optimizing utilization of the logic, in the master terminal, the auxiliary terminals are likewise capable of communicating with the control unit. As a result of this logic circuit sharing, the auxiliary terminal units may be fabricated into a relatively small sized package. Also, the cost of the individual auxiliary terminals is far less than the cost of a completely independent terminal, that includes a full complement of logic circuits, capable of communicating with a control unit, without time sharing with a master terminal.

A further significant advantage of the present system is an increased system reliability due to the decrease in the number of individual logic components and circuits required to carry out the data entering functions of a multiple keyboard terminal system.

BRIEF DESCRIPTION OF THE FIGURES

The above-mentioned objects and advantages of the present invention will be more clearly understood when considered in conjunction with the accompanying drawings, in which:

FIG. 2 is a logic block diagram of the invention.

DETAILED DESCRIPTION OF THE INVENTION

Figure 1:
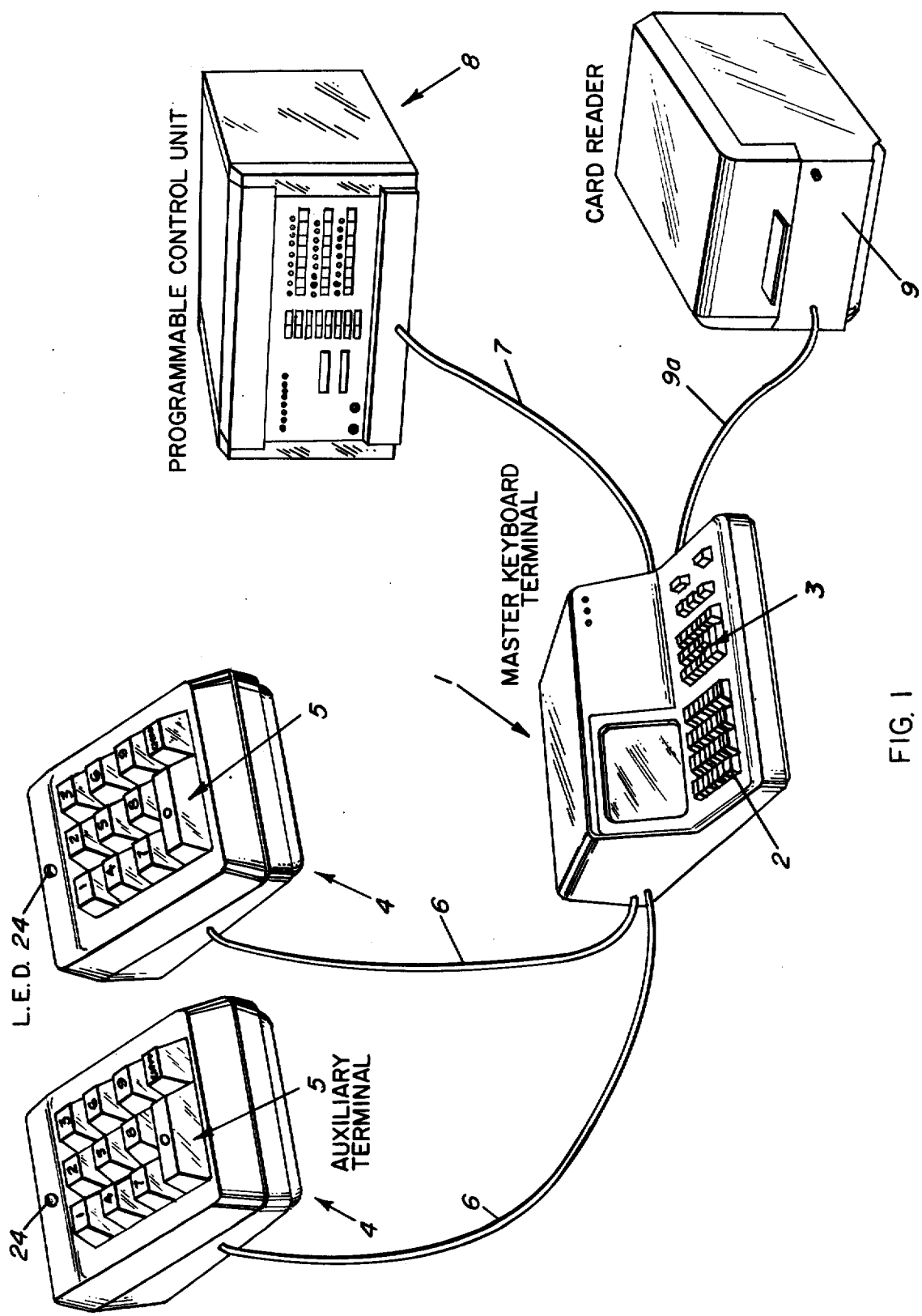
FIG. 1 is a perspective view of the individual component housings that comprise a system operated in accordance with the present invention.

Referring to the figures, and more particularly FIG. 1, a master keyboard terminal is generally indicated by reference numeral 1. The terminal is of the type manufactured by Bunker Ramo Corp. and known in the trade as the BCS-90. The master terminal is provided with a number of function keys 2 as well as numerical digit keys (keyboard) 3. A plurality of auxiliary keyboard terminals, similarly referred to as security pads, are connected to a single master terminal. The auxiliary terminals are generally denoted by reference numeral 4 and are seen to include numerical keyboards 5, upon which data may be entered. Cables 6 connect each of the auxiliary terminals with the master terminal 1. A cable 7 interconnects the master terminal with a programmable control unit 8. By utilizing a considerable amount of logic circuitry in the master keyboard terminal 1, the various auxiliary keyboard terminals 4 may communicate with the programmable control unit 8.

In a typical installation, the illustrated system is utilized in a bank. For example, each teller would be equipped with a master terminal 1, with several auxiliary terminals 4 being available to teller customers, simultaneously. In a typical transaction, a customer may wish to withdraw funds from his account. In many banking facilities, this may be done by presenting a credit card. In the utilization of the present system, the customer is requested to enter a personal identification number on the keyboard of 4. The credit card is presented to the teller and this is inserted in a card reader 9, which is of conventional design and is capable of reading encoded information, such as on a magnetic strip located on the card. A cable 9a connects the card reader with the master terminal 1, thereby automatically entering the customer's account number into the master keyboard terminal 1. If the customer has entered the correct personal identification number on the keyboards 5, which corresponds with his account number as read from the credit card, in the card reader 9, then a suitable indication is generated at the master terminal 1. Inasmuch as the master terminal 1 is provided with a numerical keyboard, it is not necessary for a credit card to be presented. Otherwise stated, a customer's account number may be manually entered on the keyboard 3 of the master keyboard terminal 1. Again, if the entered personal identification number corresponds with the account number, a suitable acknowledgment of this situation occurs at the master keyboard terminal 1.

Referring to FIG. 2, the block diagram logic circuitry of auxiliary terminal or security pad 10 is illustrated, along with the necessary logic components utilized in the master terminal 1. Physically, each security pad appears as shown in FIG. 1 and denoted by reference numeral 4.

A security pad is indicated in the block diagram by the reference numeral 10. Conventional keyboard switches 14 provide input code information, entered by a customer, to a multiplexing unit (MUX) 12, that is identified as a 16:1 MUX. The MUX 12 is commercially available from Texas Instruments, and is known as a 74150 chip. The MUX 12 is not only provided with inputs from the keyboard switches 14, but also four inputs, generally indicated by reference numeral 16 which are derived from a 4 bit counter, to be explained hereinafter. An output is derived, on line 18, from the MUX 12 when coincidence occurs between a particular single closing of switches 14 and a corresponding digital number at the second input set 16. The output at 18 is inhibited until a suitable control signal appears on line 20, which is fed at input 22 to the MUX 12. The control signal at 20 is derived from the master terminal and is essentially a means for a teller, operating the master terminal to enable a particular security pad. Although the circuitry of one particular security pad 10 is illustrated, it is to be understood that the illustrated system in FIG. 2 is intended to be utilized by either one or more security pads as indicated in FIG. 1. In order to indicate to a customer, that his security pad has been activated, an LED 24, connected to the signal line 20, is energized. The LED is mounted in the housing of auxiliary terminal 4 (FIG. 1). The cathode of the LED is connected to the signal line 20, while the anode is connected to a potential 28, via a load resistor 26.

A free-running oscillator 30 provides a first input 32 to an AND gate 35. The gate further includes three additional inputs 34, 36 and 38, to be described hereinafter. An output 40 from the AND gate is activated when all inputs are in a binary 1 state.

In normal operation of the system, a first 4 bit counter 42 cyclically generates the four most significant bits of a code at output lines 44. When the four most significant bits have been generated at the output lines 44, a pulse occurs at output line 46 to create the generation of the four least significant bits at the output lines 50 of a second 4 bit counter 48. The 4 bit counters 42 and 48 may be commercially acquired from Texas Instruments, and each is known as a 7493 chip. The eight bits presented at output lines 44 and 50 create a code that is utilized to generate data indicative of key depression at the security pad 10.

The four most significant bits on lines 44 are provided to a 4:16 decoder 52, which may be provided by Texas Instruments, and known as a 74154 chip. The decoder will sequentially energize each of the output lines, in the current case the number being 16. These output lines are generally indicated by reference numeral 54. The purpose of the lines 54 will become apparent hereinafter.

The four least significant bits on lines 50 are provided as inputs to a 16:1 MUX 58. The MUX 58 is identical to the previously described MUX 12. Inputs to the MUX 58 are also provided at 60 from from a key matrix 56, which is a conventional key switch matrix, as utilized on keyboard terminals. In the case of key matrix 56, it is a matrix directly connected to the keys 3 of the master keyboard terminal 1. If the master keyboard terminal were to be used in an operation not requiring a security pad 10, the following occurs. A key of the keyboard 3, on the master keyboard terminal 1 is depressed. For example, if this represents the key for the number "7," an output from the key matrix 56 will occur when a preselected one of the lines 54 is energized, corresponding to the number "7." When the lines 50, at the input to MUX 58 correspond to the number "7," an output is generated on line 88. This is the means for detecting the depression of the key, corresponding to the number "7," on the keyboard 3 of the master keyboard terminal 1. The line 88 provides an input to the OR gate 90. Thus, as soon as a signal appears on line 88, it is passed through the gate and provides an input along line 102 to a debounce logic circuit 104, which is of conventional design used prevalently in keyboard designs and is of the type disclosed in my co-pending application Ser. No. 612,892, now U.S. Pat. No. 4,020,391, entitled "CRT CURSOR SCAN CONTROL CIRCUITS."

The output 106 from the debounce circuit 104 sets a flip-flop 108, which in turn enables flip-flop 110. Upon the occurrence of a scan signal at line 116, from a programmable control unit (PCU-not shown), an enable signal is transferred, along line 126 to the flip-flop 110 which causes the flip-flop 110 to set and generate an enable signal at 112. Upon the occurrence of this enable signal, the data resulting from the most significant bits at lines 44, and the least significant bits on line 50, pass through corresponding gates 130 to the PCU, for appropriate data processing, which does not form a part of the present invention.

Thus far, data generation from the keyboard 3 of the keyboard terminal 1 has been described. In accordance with the present invention, the ensuing discussion will be directed to the generation of data, from a security pad 10, when a key on said security pad is depressed. As will become manifestly clear, a significant portion of the logic previously discussed in connection with the master terminal, is also utilized in the generation of data from the security pad 10.

Concerning further operation of the system, when the scan signal appearing at 116 is dropped, the falling edge, appearing on line 118 passes through an inverter 120 and fires a one-shot 122. In order to ensure that there is coincidence between the falling edge of the scan signal at 116, and the dumping of data from gates 130, a second input 124, derived from the PCU, is provided to the one-shot 122, so that a pulse signal is derived at the output of the one-shot 122, serving to reset the flip-flop 108. Resetting of this flip-flop is communicated, along line 128, to reset the second flip-flop 110. This inhibits further generation of an enabling signal along line 112. Thus, further dumping of data through the gates 130, to the PCU is halted.

In order to maintain the code generated from the bits at lines 44 and 50, while the information is being dumped to a PCU, gate 35 acts to inhibit the counters 42 and 48. The inhibit function of gate 35 occurs when an inverted signal is detected from the closing of any key, which is sensed at line 36 by the occurrence of a binary zero. The signal on line 36 is the invert of the signal on line 102. A second input line which inhibits gate 35, is indicated by reference numeral 38, and is derived, as a binary zero, from the inverted output of the debounce circuit 104. A last inhibit function is achieved by a fourth binary zero input at line 34, to the gate 35. This last mentioned input to the gate 35 is derived from the inverted output of flip-flop 108.

This permits all the data to be dumped to the PCU, before the counters are set into motion once again.

Security pad enable flip-flops 62 and 82, respectively enable the electronics of a first security pad 10 and a second security pad (not shown in FIG. 2), which would be identical to the first. Of course, the system could be expanded to handle moe than two security pads. However, for purposes of convenience, the system will be discussed in connection with a maximum of two such security pads. Flip-flop 62 is identified as a D-flip-flop having a first input connected to ground, through a switch 64. This switch is located as part of the functional keys 2, on the master terminal 1 (FIG. 1). Upon depression of switch 64, the flip-flop 62 is set and a signal appears on line 70, a first input to gate 84. A second input 72 is actuated when a signal appears at line 18 from MUX 12, as previously discussed. Finally, a signal occurs at the third input 74 of the gate 84 when a preselected line 74, of the line group 54, is actuated. The gate is an AND gate and becomes enabled when all three inputs are activated. An appropriate output thus occurs at line 86, which provides a first input to a subsequent OR gate 90. At this point, the logic construction and operation is identical to that previously discussed in connection with the entry of data from the master terminal.

An identical operation occurs for the flip-flop 82, in connection with a second security pad (not shown in FIG. 2) associated with an output 92, coming from an AND gate 94, and going to the OR gate 90. In the case of a second security pad, a second enable switch 76 is provided with the keys 2 of the master keyboard terminal 1 (FIG. 1). Closure of the switch 76 activates a first input to the flip-flop 82. Second and third reset inputs to the flip-flop are 78 and 80 which are respectively identical to the reset inputs 66 and 68 of flip-flop 62. The second and third inputs to each flip-flop 62, 82 are respectively derived when signals are produced along line 88 and at the output of flip-flops 108. Similarly, a signal occurs on input 98 to gate 94 when an output occurs at line 18, as previously mentioned. The third input 100 of gate 94 is connected to the previously mentioned line 74 which forms an output from the decoder 52. Thus, upon the simultaneous occurrence of signals on input lines 96, 98 and 100, of gate 94, an input is provided along input line 92, of gate 90 to generate an output signal along line 102. From this point, data entered on keyboard switches 14 on security pad 10, is dumped to a PCU as previously explained in connection with master keyboard 1.

As will be appreciated from the above discussion, the present invention offers marked advantages in terms of reduction of cost and system reliability, as well as maximizing packaging.

It should be understood that the invention is not limited to the exact details of construction shown and described herein for obvious modifications will occur to persons skilled in the art.

What is claimed is:

1. A system having a master keyboard terminal and an auxiliary keyboard terminal, the auxiliary terminal comprising:
   a. keyboard switch means for entering data thereon;
   b. multiplexing means having the switch means connected to a first input thereof;
   c. a second input of the multiplexing means enabled by a selection switch in the master keyboard terminal;
   d. a third input of the multiplexing means connected to the master keyboard terminal for carrying a variable count, generated by the master keyboard terminal; and
   e. an output of the multiplexing means for carrying a control signal upon coincidence between the data entered on the keyboard switch means and a particular count of the variable count, simultaneous with a signal appearing at the second input;
   f. the control signal transmitted to the master keyboard terminal for dumping the particular count from the master keyboard terminal to an external data processing device, corresponding to the entered data.

2. The subject matter set forth in claim 1 together with light emitting means located on the auxiliary keyboard terminal and connected in circuit with the second input of the multiplexing means for producing a visible signal to an operator, when a signal from a master keyboard terminal appears at the second input.

3. In a system having a master keyboard terminal and at least one auxiliary keyboard terminal, dependent upon the master terminal, the master terminal comprising:
   a. means for sequentially generating varying counts;
   b. first gating means connected at its input to outputs of the count generating means;
   c. means for manually entering data in the master keyboard terminal and means connected between the count generating means and the manual entering means for detecting coincidence between data manually entered at the master keyboard terminal and a corresponding generated count of the varying counts for producing a first control signal; and
   d. means for communicating the first control signal to the first gating means for dumping a particular count of the varying count from the first gating means to an external data processing device, the particular count corresponding to entered data;
the auxiliary keyboard terminal comprising:
   e. keyboard switch means for entering data thereon;
   f. multiplexing means having the switch means connected to a first input thereof;
   g. a second input of the multiplexing means enabled by a selection switch in the master keyboard terminal;
   h. a third input of the multiplexing means connected to the count generating means for carrying the varying count;
   i. an output of the multiplexing means for carrying a second control signal upon coincidence between the data entered on the keyboard switch means and a particular count of the variable count, simultaneous with a signal appearing at the second input; and
   j. means for communicating the second control signal to the first gating means for dumping a particular count of the varying count from the first gating means to an external data processing device, the particular count corresponding to entered data.

4. The subject matter set forth in claim 3 together with light emitting means located on the auxiliary keyboard terminal and connected in circuit with the second input of the multiplexing means for producing a visible signal to an operator, when a signal from the master keyboard terminal appears at the second input.

5. The subject matter set forth in claim 4 wherein the count generating means comprises:
   oscillator means for producing periodic pulses;
   counter means connected in circuit with the output of the oscillator means for producing the counts at the output of the counter means, as the latter increments in response to actuation by the oscillator means;
and further wherein the means for communicating the first and second control signals to the first gating means comprises:
   debounce means responsive to the first or second control signal for ensuring that a control signal has characteristics, indicative of a valid control signal; and
   means connected in circuit with the output of the debounce means for generating a dump signal in response to a valid control signal, occurring simultaneous with a scan signal generated by the external data processing device and communicated to the dump signal generating means;

the first gating means dumping the particular count input in direct response to the dump signal;

and further together with inhibit gating means connected intermediate the oscillator means and the counter means;

means connecting keys of the master keyboard terminal and the auxiliary keyboard terminal to the input of the inhibit gating means;

means connecting the output of the debounce means to the input of the inhibit gating means; and means connecting the dump signal producing means to the input of the inhibit gating means;

the inhibit gating means inhibiting the operation of the counter means in response to any occurrence of:

(1) keyboard actuation of the master keyboard terminal or auxiliary keyboard terminal;

(2) an output from the debounce means; or (3) a signal produced by the means for producing a dump signal;

thus maintaining the variable count in a particular state, momentarily, as the count is dumped through the first gating means;

and further together with second gating means located at the input of the debounce means for gating either the first control signal or the second control signal to the debounce means.

6. The subject matter set forth in claim 3 wherein the count generating means comprises:

oscillator means for producing periodic pulses; and counter means connected in circuit with the output of the oscillator means for producing the counts at the output of the counter means, as the latter increments in response to actuation by the oscillator means.

7. The subject matter set forth in claim 3 wherein the means for communicating the first and second control signals to the first gating means comprises:

debounce means responsive to the first or second control signal for ensuring that a control signal has characteristics indicative of a valid control signal; and means connected in circuit with the output of the debounce means for generating a dump signal in response to a valid control signal, occurring simultaneous with a scan signal generated by the external data processing device and communicated to the dump signal generating means;

the first gating means dumping the particular count input in direct response to the dump signal.

8. The subject matter set forth in claim 7 wherein the count generating means comprises:

oscillator means for producing periodic pulses; and counter means connected in circuit with the output of the oscillator means for producing the counts at the output of the counter means, as the latter increments in response to actuation by the oscillator means, and further together with inhibit gating means connected intermediate the oscillator means and the counter means;

means connecting keys of the master keyboard terminal and the auxiliary keyboard terminal to the input of the inhibit gating means;

means connecting the output of the debounce means to the input of the inhibit gating means; and means connecting the dump signal producing means to the input of the inhibit gating means;

the inhibit gating means inhibiting operation of the counter means in response to any occurrence of:

1. keyboard actuation of the master keyboard terminal or auxiliary keyboard terminal;

2. an output from the debounce means; or 3. a signal produced by the means for producing a dump signal;

thus maintaining the variable count in a particular state, momentarily, as the count is dumped through the first gating means.

9. The subject matter set forth in claim 7 together with second gating means located at the input of the debounce means for gating either the first control signal or the second control signal to the debounce means.

* * * * *